United States Patent [19]

Nozemack et al.

[11] Patent Number: 4,542,118
[45] Date of Patent: Sep. 17, 1985

[54] CATALYST MANUFACTURE

[75] Inventors: Richard J. Nozemack, Reisterstown; John A. Rudesill, Baltimore; Dean A. Denton, Baltimore; Raymond D. Feldwick, Timonium, all of Md.

[73] Assignee: W. R. Grace & Co., New York, N.Y.

[21] Appl. No.: 576,496

[22] Filed: Feb. 2, 1984

[51] Int. Cl.⁴ .................. B01J 29/08; B01J 21/12; B01J 21/16
[52] U.S. Cl. ........................ 502/65; 502/64; 502/68; 502/263
[58] Field of Search ............ 502/65, 64, 263, 355, 502/10, 68

[56] References Cited

U.S. PATENT DOCUMENTS 4,443,553  4/1984  Chiang et al. .............. 502/64 X
4,458,023  7/1984  Welsh et al. .................. 502/65

FOREIGN PATENT DOCUMENTS 305903  6/1971  U.S.S.R. ..................... 502/63

Primary Examiner—Carl F. Dees
Attorney, Agent, or Firm—Arthur P. Savage

[57] ABSTRACT

Catalysts and catalyst supports are prepared by forming and drying, preferably spray-drying, an aqueous slurry of inorganic solids such as zeolites, clay, silica, alumina, and silica-alumina gel, and aluminum chlorhydrol to obtain particulate composites. The particulate composites are then reacted with ammonia in the absence of free liquid water to convert the aluminum chlorhydrol into a cohesive binder. The ammonia-reacted composites may then be washed, ion exchanged and thermally activated to obtain active attrition resistant catalysts and catalyst components.

17 Claims, 1 Drawing Figure

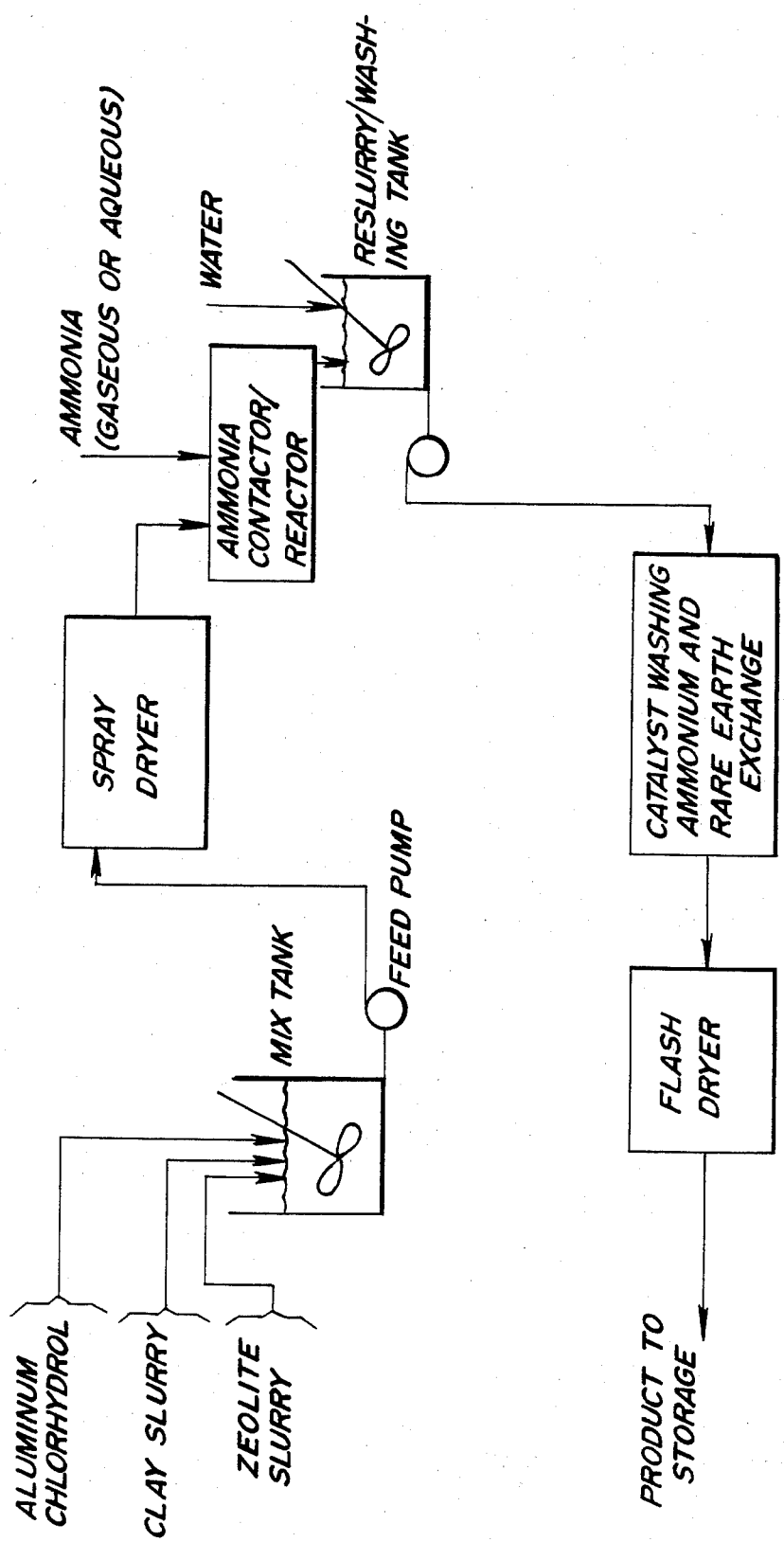

CATALYST MANUFACTURE

The present invention relates to the manufacture of catalysts and catalyst supports, and in particular to the preparation of hard, attrition resistant zeolite containing catalysts which are highly active for the catalytic conversion of hydrocarbons.

Hydrocarbon conversion catalysts such as fluid cracking catalysts (FCC) which comprise crystalline zeolites dispersed in an inorganic oxide matrix are typically prepared by spray drying an aqueous slurry of zeolite, clay and a suitable binder such as silica-alumina hydrogel, silica sol or alumina sol. The spray dried catalyst particles may be calcined and ion exchanged to remove undesirable alkali metal impurities.

Canadian No. 967,136 describes hydrocabon conversion catalyst which comprises zeolite, clay and an alumina sol binder. The catalysts are prepared by spray drying a mixture of low soda ion exchanged zeolite, clay, and alumina sol (chlorhydrol), and calcining the spray dried particles to obtain hard, attrition resistant catalysts.

U.S. Pat. No. 2,723,243 discloses a method for preparing catalysts wherein droplets of silica or silica-alumina hydrosol are contacted with an atmosphere of hot ammonia gas to form gelled catalyst particles.

U.S. Pat. Nos. 3,464,929, 3,542,670 and 3,562,148 describe methods for preparing hydrocarbon conversion catalysts wherein finely divided zeolites are mixed with an aluminum hydroxyl halide sol, gelling the resultant mixture and calcining the gelled mixture.

In recent years the cracking catalyst industry has been particularly concerned with regard to the production of inexpensive catalysts which are highly attrition resistant, active and selective for the production of gasoline fractions.

It is therefore an object of the present invention to provide a process by which highly active, attrition resistant catalysts and catalyst supports may be economically prepared.

It is another object to provide a method for preparing hard, attrition resistant hydrocarbon conversion catalysts wherein the need for high temperature calcination steps may be eliminated.

It is still a further object to provide zeolite containing fluid cracking catalysts which are suitable for the cracking of residual hydrocarbons having boiling points in excess of about 600° F.

These and other objects of the present invention will become readily apparent to one skilled in the art following the detailed description and drawing wherein the figure comprises a block flow diagram which outlines a process which incorporates the teaching of our invention.

Broadly, our invention contemplates methods for preparing alumina bound catalysts and catalyst supports wherein at least one particulate inorganic oxide component, such as zeolite, clay, silica, alumina and/or silica alumina gel, is combined with aqueous aluminum chlorhydrol sol to obtain a mixture which is formed into particulate composites that are reacted with ammonia, preferably gaseous ammonia, under conditions wherein contact of the composites with liquid water is substantially avoided until conversion of the aluminum chlorhydrol into a cohesive binder is essentially complete.

More specifically we have found that valuable catalysts and catalyst supports may be obtained by the process which is outlined as follows:

(1) Particulate inorganic solid catalyst components, such as zeolite, alumina, silica, alumina and/or silica-alumina gels, are mixed with aluminum chlorhydrol and water to obtain a mixture that is of a formable consistency.

(2) The mixture is then formed into particles of desired shape and size and dried to obtain solid particulate aluminum chlorhydrol containing composites.

(3) The particulate composites are then reacted with ammonia in the absence of liquid water to convert the aluminum chlorhydrol component into an alumina binder and to impart significant physical strength to the particles.

(4) The ammonia-reacted composites are then washed with water to remove soluble salts, including by-product ammonium chloride, and, if required ion-exchanged, washed and thermally activated to obtain desired catalytic properties.

A more clear understanding of our invention may be obtained by reference to the drawing which outlines a preferred fluid catalytic cracking catalyst preparation method that incorporates the teachings of our invention.

As shown in the drawing, sources of aluminum chlorhydrol solution, zeolite and clay are combined in a mixer device to obtain a uniform aqueous slurry which contains from about 20 to 60 percent by weight solids. The mixed chlorhydrol/zeolite/clay slurry is spray dried to convert the slurry into particulate solid composites having an average particle size range of about 50 to 75 microns that comprise zeolite and clay particles and aluminum chlorhydrol. The composites are reacted with ammonia in a contactor-reactor substantially in the absence of liquid water to obtain hard, attrition resistant particles. During the ammonia-reaction step, the aluminum chlorhydrol is converted to a strong alumina binder phase. As shown in the drawing, soluble salts including ammonium chloride by-products which are formed during the reaction of aluminum chlorhydrol and ammonia, are removed from the composites by subsequent washing with water.

In the process shown in the drawing, the ammonia reacted catalyst composites may be ion exchanged and further washed to remove excess alkali metal oxide and other soluble impurities which may be present. The ion exchange step may be conducted using an ammonium salt solution such as ammonium sulfate and/or rare earth chloride solution. The ion exchanged composite is preferably washed with water to remove soluble impurities. Subsequent to ion exchanging and washing, the catalyst composites, which at this point contains less than about 1 percent, preferably less than 0.5 percent, and still more preferably to less than 0.2 by weight alkali metal oxide, is dried to a level of about 5 to 25 percent by weight moisture.

The aluminum chlorhydrol solution used in the practice of the present invention is readily available from commercial sources and typically possesses the formula $Al_{2+m}(OH)_{3m}Cl_6$ wherein m has a value of about 4 to 12.

The aluminum chlorhydrol solutions are also frequently referred to in the art as polymeric cationic hydroxy aluminum complexes or aluminum chlorhydroxides which are polymers formed from a monomeric precursor having the general formula $Al_2(OH)_5Cl.2$-

$H_2O$. For the purpose of the present application, the binder component will be referred to as aluminum chlorhydrol. The preparation of the aluminum chlorhydrol solution is typically disclosed in U.S. Pat. No. 2,196,016, Canadian No. 967,136, and in U.S. Pat. No. 4,176,090. Typically, preparation of aluminum chlorhydrol involves reacting aluminum metal and hydrochloric acid in amounts which will produce a composition having the formula indicated above. Furthermore, the aluminum chlorhydrol may be obtained using various sources of aluminum such as alumina ($Al_2O_3$), clay and/or mixtures of alumina and/or clay with aluminum metal. Preferably, the aqueous aluminum chlorhydrol solutions used in the practice of the present invention will have a solids content of from about 15 to 30 percent by weight $Al_2O_3$.

The zeolite component used in a preferred practice of our invention is a synthetic faujasite zeolite such as sodium type Y zeolite (NaY) which contains from about 10 to 15 percent by weight $Na_2O$. It is also contemplated that the zeolites may be ion exchanged and thermally treated to lower the soda level thereof prior to incorporation in the catalyst. Typically, the zeolite component may comprise a partially ammonium exchanged type Y zeolite ($NH_4NaY$) which will contain in excess of 1 percent and more frequently from about 3 to 6 percent by weight $Na_2O$. The ammonium exchanged Y zeolites may be heated to obtain the ultrastable type Y zeolites (USY) described in U.S. Pat. No. 3,293,192 and U.S. Pat. No. 3,449,070. Calcined rare-earth exchanged type Y zeolites (CREY) prepared in accordance with the processes disclosed in U.S. Pat. No. 3,402,996, U.S. Pat. No. 3,607,043, and U.S. Pat. No. 3,676,368 may also be used in the practice of the invention. It is also contemplated that the zeolite component may comprise a mixture of zeolites such as synthetic faujasite in combination with mordenite and the ZSM type zeolites.

The catalysts of the present invention may contain substantial quantities of an inorganic oxide particulate component such as clay, silica gel, alumina gel and/or silica-alumina gel. While kaolin is a preferred clay component, it is also contemplated that thermally modified kaolin such as metakaolin may be included in the catalyst composition.

During the mixing step, shown in the drawing, a spray-dryer feed slurry is obtained which contains from about 20 to 60 weight percent solids, of which from about 5 to 25 parts by weight comprises aluminum chlorhydrol (dry basis) as $Al_2O_3$, 1 to 60 parts by weight zeolite, and from about 0 to 90 weight percent clay. While the drawing illustrates a process by which fluid cracking catalysts are obtained by spray drying the catalyst preparation slurry, it is also contemplated that particulate catalysts of larger particle size, i.e. on the order of from about ½ to 2 mm may be obtained by forming beads or pills of the present compositions which are particularly useful for the preparation of hydroprocessing catalysts such as hydrocracking, hydrodesulfurization, hydrodenitrogenation, and demetallization catalysts.

The spray drying step shown in the drawing is conducted using inlet temperatures in the range of from about 300° to 400° C. and outlet gas temperatures of from about 100° to 200° C. During the spray drying step, the moisture content of the particles is reduced to about 10 to 30 percent by weight. Spray dried catalyst composites typically have a particle size on the order of 20 to 150 microns and preferably an average particle size (APS) range of 60 to 75 microns.

As shown in the drawing, after spray drying the catalyst composites are reacted with ammonia in a contactor/reactor apparatus at temperatures on the order of from about 20° to 150° C., and preferably from about 50° to 150° C. for a period of from about 1 to 5 minutes, and preferably about ½ to 3 minutes. During the ammonia reaction step the aluminum chlorhydrol component is converted to a cohesive, solid alumina gel binder phase which produces a tough, attrition resistant catalyst particle.

The quantity of ammonia which is reacted with the spray dried catalyst composite ranges from about 1.0 to 2.0 mols ammonia ($NH_3$) per mol of chloride ($Cl^-$) contained in the aluminum chlorhydrol present in the composite, and preferably a slight excess of ammonia. A convenient method for observing and controlling the amount of ammonia used involves monitoring the pH of the solution in the reslurry/washing tank and adjusting the ammonia flow to the contactor/reactor to maintain a pH of about 7 and preferably from about 7.5 to 9.5. Preferably, gaseous ammonia is used in the ammonia reaction step. However, under certain conditions it is possible to use aqueous ammonia solutions, i.e. ammonia hydroxide ($NH_4OH$), which contains about 10 to 30% by weight $NH_3$ as a source of reactive ammonia. During the ammonia reaction step it is necessary to conduct the reaction under conditions wherein the spray dried composite particles are maintained essentially separate from any free separate liquid phase until conversion of the aluminum chlorhydrol into a gelled, cohesive alumina binder is essentially complete. When the preferred gaseous ammonia is used, the reaction occurs essentially as a solid-gas reaction. When ammonium hydroxide solution is used, the quantity of liquid present in the particles during the reaction should not exceed that required to fill the internal pore volume of the particles, i.e. incipient wetness. Preferably, the ammonia reaction is conducted using relatively warm spray dried composites, i.e. about 100° to 150° C, under conditions wherein any excess moisture added during the reaction is continuously evaporated and removed from the reaction zone as water vapor.

The ammonia reaction is conducted in a contactor-reactor apparatus wherein the spray dried particles are throughly contacted and reacted with ammonia. A particularly preferred contactor-reactor apparatus comprises a closed, elongated blade mixer which maintains a moving bed of spray dried composites in constant agitation while cocurrent contact with ammonia occurs. It is also contemplated that ammonia gas or solution may be injected into the lower section of a spray drier, or into a screw conveyor device which may be used to simultaneously transfer the spray dried particles to the water washing step wherein by-product ammonia/chloride reaction products are removed along with other water-soluble salts which may be present.

The ion exchange step shown in the drawing, which may be used to reduce the alkali metal oxide level of the catalyst composites to less than about 1 and preferably less than 0.5, and more preferably below 0.2 percent by weight, is conducted using water and/or aqueous ammonium salt solutions such as ammonium sulfate solution and/or solutions of polyvalent metals such as rare earth chloride solutions. Typically, the ion exchange solutions contain from about 1 to 10 weight percent dissolved salts. Frequently, it is found that multiple exchanges are beneficial to achieve the desired degree of alkali metal oxide removal. In general, the exchanges are conducted at temperatures on the order of from 50° to 100° C. Subsequent to ion exchanging, the catalyst components are washed, typically with water, to lower the soluble salt level to a desirable level.

Subsequent to ion exchange and washing, the catalyst composites are dried, typically at temperatures ranging from about 100° to 200° C. flash drying to lower the moisture content thereof to a level of preferably below about 15 percent by weight. Subsequent to flash drying the catalyst particles possess a significant degree of attrition resistance, i.e. from about 15 to 30 DI and 1.5 to 4.0 JI, and are ready for use in a fluid catalytic cracking (FCC) process. When exposed to the high temperature conditions present in a commercial FCC process, i.e. 600° to 800° C., the catalyst particle increase in attrition resistance to a level of 8 to 12 JI. It is also contemplated that the dried/ammonia-reacted composites may be subjected to a thermal activation calcination step conducted at a temperature of about 400° to 700° C. prior to use. This high temperature calcination step removes water from the composites and converts the gelled-hydrous alumina binder into a particularly strong attrition resistant form of alumina.

Cracking catalysts obtained by our process are highly active for the catalytic cracking of hydrocarbons. Typically, it is found that the activity of these catalysts range from about 60 to 90 volume percent conversion subsequent to deactivation at elevated temperatures when tested in accordance with the standard activity test procedures set forth in ASTM test procedure D-3907. Furthermore, it is found that the catalysts are highly selective for the production of gasoline, and in particular, selective for the production of cracked gasoline fractions which have a high octane rating. Furthermore, the catalysts are extremely tough and attrition resistant.

While the primary components of the catalysts prepared by our process comprise zeolite, aluminum chlorhydrol and optionally, clay, it is also understood that other components such as particulate alumina, silica, and silica-alumina gels may be added. Furthermore, it is understood that the catalyst may be combined with minor quantities (1 to 100 ppm) of platinum and palladium which are added for the purpose of enhancing the CO oxidation characteristics of the catalyst. The attrition properties of the catalyst are expressed in terms of the Davison Index (DI) and the Jersey Index (JI) which are determined as set forth in U.S. Pat. No. 4,247,420.

Having described the basic aspects of the present invention, the following examples are given to illustrate specific embodiments thereof.

EXAMPLE 1

A series of fluid catalytic cracking catalyst samples were prepared using a process similar to that set forth in the drawing. A spray drier feed slurry was prepared in the mix tank which contained the following ingredients:

| Component | % by weight |
|---|---|
| Aluminum Chlorhydrol (formula 23% $Al_2O_3$, 8% Cl) | 8.58 ($Al_2O_3$ + Cl) |
| Clay (kaolin) | 37.12 |
| *Zeolite (CREY) | 9.30 |
| $H_2O$ | 45.00 Total Basis |

*Calcined rare earth exchanged Type Y zeolite given an additional ammonium exchange to reduce $Na_2O$ to approximately 1.0 wt. %.

The mixed slurry was spray dried at a temperature of 425° C. to obtain catalyst composites which contained about 16 to 22 weight % moisture and an average particle size of 65 to 80 microns. The composites were reacted with ammonia gas or aqueous ammonia solution (20 wt. % $NH_3$) in a Sprout-Waldron Koppers Model 12-4.5 Double Agitator mixer reactor having interior dimensions of 12" wide by 4½' long, and a working capacity of 1.2 cubic feet in which the agitators are capable of revolving from 80 to 500 RPM.

In a first series of runs (A) anhydrous ammonia gas was fed into the inlet of the mixer and ran co-currently with the churning catalyst. The mixing action continuously exposed a new catalyst bed surface to the ammonia gas, allowing absorption-reaction to take place very efficiently. The flow of ammonia gas and feed rate of catalyst was varied to control the ratio of catalyst to ammonia pick-up. This ratio was conveniently monitored by measuring the pH of the ammoniated catalyst during water washing step. A pH of 8.0 or above indicated that ammoniation was adequate enough to substantially complete neutralization of the chlorhydrol binder. The speed (RPM) of the agitations was controlled to provide a desired degree of mexing and residence time.

In a second and third (B and C) series of runs, solutions of ammonium hydroxide (20% $NH_3$) were applied to the spray dried composites at room temperature by injecting a solid stream through a single orifice (B) or spraying $NH_4OH$ directly into the mixing bed through a series of spray nozzles (C). It was observed that if directly injected or sprayed ammonium hydroxide is evenly dispersed throughout the particulate composites a satisfactory product is obtained.

The physical properties of the catalyst samples are summarized in Table I after washing composites with water, flash drying at 400° F., and in some instances heating/activating at 1000° F.

TABLE I

| | A. Anhydrous Ammonia Gas | | | |
|---|---|---|---|---|
| Run # | Feed Rate Catalyst/$NH_3$ (#/min.) | RPM | pH Slurry | DI/JI* |
| 1 | 12/0.35 | 120 | 8.03 | 2.5/0.5 |
| 2 | 12/0.35 | 120 | 8.48 | 1.3/0.4 |
| 3 | 12/0.35 | 120 | 7.87 | 4.1/0.6 |
| 4 | 12/0.35 | 120 | 8.4 | 5.0/0.7 |

| | B. Direct Injection of 20% $NH_3$ Ammonium Hydroxide | | | | |
|---|---|---|---|---|---|
| Run # | Feed Rate Cat./$NH_3$ Soln. (#/min)/(#/min) | RPM | PH Slurry | DI/JI | DI/JI* |
| 1 | 12/1.5 | 120 | 8.8 | 36/3.7 | 7/0.7 |
| 2 | 12/1.5 | 120 | 9.4 | 31/2.1 | 17/2.1 |
| 3 | 12/1.5 | 200 | 9.4 | 33/0.6 | 24/2.5 |
| 4 | 12/0.8 | 120 | 8.2 | 27/2.9 | 15/1.9 |
| 5 | 12/1.2 | 120 | 7.3 | 17/2.2 | 5/0.6 |
| 6 | 42/6.5 | 500 | 8.8 | — | 8.4/1.3 |
| 7 | 48/6.5 | 500 | 7.7 | — | 3.9/0.5 |
| 8 | 42/6.5 | 500 | 8.2 | — | 5.6/0.7 |
| 9 | 42/6.5 | 250 | 8.4 | — | 4.8/0.6 |

| | C. Spraying 20% $NH_3$ Ammonium Hydroxide | | | | |
|---|---|---|---|---|---|
| Run # | Feed Rate Cat./$NH_3$ Soln. (#/min) | RPM | PH Slurry | DI/JI | DI/JI* |
| 1 | 12/1.6 | 120 | 9.6 | 32/2.4 | 12/1.7 |
| 2 | 12/1.4 | 120 | 9.3 | 43/4.2 | 8/1.3 |
| 3 | 12/1.2 | 120 | 7.7 | 17/2.0 | 11/1.6 |

TABLE I-continued

| 4 | 12/1.2 | 200 | 7.8 | 18/2.1 | 11/1.4 |

*after activation at 1000° F. for 2 hours.

The data in Table I shows that ammoniation-reaction with the anhydrous gas is the preferred method in that catalyst product having good attrition resistance (low DI/JI) is consistently obtained. It is further noted that the direct injection or spraying of ammonium hydroxide solution produced acceptable catalyst when flooding is avoided by maintaining adequate mixing (generally greater than 250 rpm).

EXAMPLE 2

An aqueous spray dryer feed slurry was prepared which contained the following ingredients:

| Components | % by wt. |
|---|---|
| Aluminum Chlorhydrol (23% $Al_2O_3$, 8% Cl) | 7.02 |
| Clay (Kaolin) | 30.38 |
| Zeolite (CREY) | 7.60 |
| $H_2O$ | 55.00 |

The slurry was spray dried at a temperature of 400° F. The hot spray dried composites were reacted with ammonia hydroxide solution (20Wt. % $NH_3$) in a contactor/reactor device which comprised a modified screw conveyer having a diameter of 9 inches and a length of 20 feet. The conveyer was equipped with 12 spray nozzles which injected the ammonia hydroxide solution at a rate of about 0.1 pound ammonia solution (0.01 lb $NH_3$) per pound of spray dried composites. The screw was operated at about 100 ppm which resulted in an average residence contact/reaction time of about 0.5 to 0.75 minute. The ammonia reacted composites were collected in a reslurry/washing tank where the wash/reslurry water was maintained at a pH of 8.5 to 9.0. The resulting reslurried catalyst particles were water washed on a filter and flash dried at a temperature of 300° F. The physical, chemical and catalytic properties of the product are summarized in Table II.

TABLE II

| Total Volatiles (wt. % @ 1750° F.) | 14.9 |
|---|---|
| $Al_2O_3$ (wt. %) | 47.36 |
| $Na_2O$ (wt. %) | 0.13 |
| $RE_2O_3$ (wt. %) | 2.70 |
| Average Bulk Density (g/cm³) | 0.88 |
| DI/JI (@ 1000° F.) | 7/0.7 |
| DI/JI (@ 300° F.) | 10/1.0 |
| Pore Volume ($H_2O$, cc/g) | 0.28 |
| Surface Area (m²/g) | 138 |
| Average Particle Size (microns) | 74 |
| Microactivity* (@ 1400° F.) | 78.8 |
| Microactivity (@ 1500° F.) | 72.1 |

*As determined per ASTM - D3907

The above example illustrates that catalysts may be economically and efficiently prepared using the teachings of our invention.

We claim:

1. A method for preparing particulate inorganic oxide composites which comprises:
   (a) preparing a mixture containing (1) a solid finely divided inorganic oxide selected from the group comprising of zeolites, clay, alumina, silica, silica-alumina and mixtures thereof, (2) aqueous aluminum chlorhydrol, and (3) water;
   (b) forming and drying said mixture to obtain particulate aluminum chlorhydrol containing composites;
   (c) reacting said composites with ammonia essentially in the absence of free liquid water to convert the aluminum chlorhydrol into a cohesive binder; and
   (d) washing the reacted composites to remove soluble salts.

2. The method of claim 1 wherein said particles are ion-exchanged and washed to obtain particles having an alkali metal oxide content of below about 0.5 weight percent.

3. The method of claim 1 wherein said aluminum chlorhydrol has the formula $Al_{2+m}(OH)_{3m}Cl_6$ wherein m has a value of about 4 to 12.

4. The method of claim 1 wherein the zeolite is a type Y zeolite.

5. The method of claim 1 wherein the composites obtained at step (d) are heated to a temperature of 400° to 700° C.

6. The method of claim 1 wherein said mixture is formed and dried at step (b) by spray drying.

7. The method of claim 2 wherein said ion exchange includes contacting the particles with a solution which includes ammonium ions and/or rare earth ions.

8. The method of claim 1 wherein said composites are reacted with ammonia at a temperature of 20° to 150° C.

9. The method of claim 8 wherein from about 1 to 2 mols of ammonia is reacted per mol of chloride contained in the chlorhydrol present in solid composites.

10. The method of claim 1 wherein gaseous ammonia is reacted with said composites.

11. The method of claim 1 wherein aqueous ammonium hydroxide solution is reacted with said composites under conditions wherein the water content of the composites does not exceed incipient wetness.

12. A catalyst composition prepared by the method of claim 1.

13. A fluid cracking catalyst composition prepared by the method of claim 6.

14. The composition of claim 12 wherein said catalyst contains from about 1 to 60 parts by weight zeolite, 5 to 25 parts by weight alumina binder, and up to about 90 parts by weight of a particulate component selected from the group consisting of alumina, silica, silica-alumina, clay and mixtures thereof.

15. The catalyst composition of claim 14 wherein said zeolite is type Y zeolite.

16. The catalyst composition of claim 15 wherein said zeolite is selected from the group consisting of rare earth exchanged, and ultrastable type Y zeolites.

17. A hydroprocessing catalyst support prepared in accordance with the method set forth in claim 1.

* * * * *